Nov. 6, 1928. 1,690,681

A. G. HUTZLEY

INDUSTRIAL TRUCK

Filed June 24, 1924 5 Sheets-Sheet 1

Nov. 6, 1928.

A. G. HUTZLEY 1,690,681

INDUSTRIAL TRUCK

Filed June 24, 1924   5 Sheets-Sheet 4

FIG. 10.

Inventor
Amiel G. Hutzley

By Edward R. Alexander,
Attorney

Nov. 6, 1928.  A. G. HUTZLEY  1,690,681
INDUSTRIAL TRUCK
Filed June 24, 1924  5 Sheets-Sheet 5

INVENTOR
Amil G. Hutzley
BY
Edward R. Alexander
ATTORNEY.

Patented Nov. 6, 1928.

1,690,681

UNITED STATES PATENT OFFICE.

AMIEL G. HUTZLEY, OF WARREN, OHIO, ASSIGNOR TO THE BAKER-RAULANG COMPANY, OF CLEVELAND, OHIO, A CORPORATION OF OHIO.

INDUSTRIAL TRUCK.

Application filed June 24, 1924. Serial No. 722,125.

This invention relates to a load handling mechanism shown herein embodied in an industrial truck. The invention may be applied to various types of truck constructions wherein one or more flexible members, such as cables, are used to operate a movable member, for example, a boom, a load engaging member, or a guided member, or a plurality of such devices. In the preferred application of the invention, I have shown an industrial truck construction in which is provided a guided element, namely, an element or member that is raised and lowered and guided between a pair of spaced guides, but it will be obvious that the mechanism may be applied to a movable member for handling loads that is mounted to move otherwise than between spaced guides.

One object of the invention is to provide a load handling mechanism with an improved take-up mechanism operable to prevent damage or disarrangement of the raising and lowering mechanism, or the flexible member or members, in case the movable member meets with an obstruction or is arrested in its movement in one direction.

Another object of the invention is to provide an improved limiting means capable of shutting off the current to the operating motor at any point in the movement of the movable member in one direction, in case its movement is stopped.

Another object of the invention is to provide a load handling mechanism having an improved take-up means for the raising and lowering mechanism, and to cooperatively associate therewith an automatic limiting means capable of turning off current to the operating motor in the event the movable member meets with an obstruction while moving in one direction.

Another object of the invention is to provide a load handling mechanism having improved means adapted to automatically stop the motor for the raising and lowering mechanism when the movable member that is operated thereby reaches any predetermined limited movement in either direction and also to stop the motor at any intermediate point, when said member is moving in one direction, upon slack occurring in the raising and lowering mechanism.

Other objects of the invention will be apparent to those skilled in the art to which my invention relates from the following description, taken in connection with the accompanying drawings, wherein—

In the drawings, 1 indicates a frame suitably supported on wheels 2, 3, preferably two pairs of wheels. The frame 1 may be of any desired construction, but it preferably consists of a pair of parallel channel bars $1^a$ and a supplemental frame $1^b$ forming side sections 4 which extend laterally to a point substantially coincident with the plane of the outer extremities of the wheels 2, to provide guards therefor, as well as a relatively wide base or platform for a plurality of batteries 5. The batteries 5 may be housed within a suitable casing 6. 7 indicates a pair of uprights secured to the bars $1^a$ adjacent one end or wall of the frame $1^b$ and serving as rigid supports for suitable brackets or plates for the controlling devices, to wit, a controller 8 and its operating handle 9 for operating a traction or driving motor 10, a steering lever 11 and a controller 12 for the hoisting or elevating motor 13. In the drawings, for illustrative purposes, one pair of wheels 3 is driven and both pairs of wheels are steerable, but it will be understood that such arrangement may be variously changed at will so that either or both pairs of wheels may be driven and either pair steered.

14 indicates a platform for the operative, while operating the truck, to stand on and to actuate the lever 11, handle 9 and the handle for the conrtoller 12. The platform 14 may be pivoted on a rod supported by a pair of depending brackets 15. The platform 14 may be counterbalanced by a weight 16 to maintain it in upright position when not in use. 17 indicates a brake for the truck, preferably operatively connected with an element driven by the motor 10. The brake 17 is controlled by a pedal (not shown) associated with the platform 14.

18 indicates a guide frame for an elevating member 19, preferably arranged at that end of the frame 1 opposite to the platform 14 and the truck controlling devices.

The guide frame section 18 preferably comprises a pair of channel or I-beams $18^a$, rigidly maintained in spaced, parallel relation by a cross member, to be later referred to, a sill 21 disposed at the upper ends of the beams $18^a$ and connections with the main frame 1 of the construction later to be described. The guide frame 18 preferably extends below the frame 1 to a point adjacent the ground or floor and thereabove to provide sufficient vertical movement for the elevating member 19, to adapt the truck to varying uses and applications in transporting and tiering, or loading and unloading goods. The guide frame 18 is preferably connected to the main frame 1 by a pair of brackets 22, each riveted at its opposite ends to the frame 1 and the adjacent channel or I-beams $18^a$. As shown in the drawings, the channel or I-beams $18^a$ constituting the guide frame 18 oppose each other, so that the side walls thereof may serve as guides for shoes 23, which are supported between the beams $18^a$ and form a part of the elevating member 19. 24 indicates a pair of tie rods or bars extending between and connected at their opposite ends to the upper ends of the beams $18^a$, or angle plates 24' secured thereto and the frame 1 and serving to brace the guide frame 18 against movement relative to the main frame 1, due to the weight of the load which at any time may be supported on the engaging and lifting device 25, to be later referred to. The sill 21 preferably comprises a pair of channel bars 21', 21', supported upon and secured to the angle plates 24', each of which is secured to the outer side of one of the I-beams $18^a$, in a well known manner. The sill 21 serves to support certain elements of a hoisting or elevating mechanism 26, to which reference will later be made.

The elevating member 19 comprises a pair of shoes 23, already referred to, connected together by a pair of spaced front and rear plates 28 and upper and lower pairs of shoe devices 23', one device of each pair being carried by one of the shoes 23 and engaging the inner opposing side walls of the adjacent beam $18^a$. Each shoe device 23' consists of a roller loosely mounted on a stud shaft 29 supported in the wall of the adjacent shoe 23. The shafts 29 are inclined so that the surfaces of the rollers may engage the inclined inner surfaces of the side walls of the adjacent beam $18^a$ and roll thereon with minimum friction. As will be understood from Figures 1 and 2, the stud shafts 29 carried by each shoe 23 are inclined at an angle relative to each other and are offset relative to the central longitudinal plane of the adjacent beam $18^a$, so that the lower roller will engage its rear side wall, the upper roller engaging its front side wall.

The device 25 is arranged to engage a body or bodies to be transported or loaded and unloaded to or from a support or pile or engaged, elevated and transported to some station and lowered. The device 25 is carried by a supporting element 30 which in turn is trunnioned on the elevating member 19 in the manner to be later described. In the form of construction shown in Figures 1 and 2, the engaging and lifting device 25 comprises a relatively long bar, preferably round in cross section and hollow from end to end to insure lightness, and adapted to be projected within and engage the inner lateral edges of a body or a plurality of bodies to be engaged, lifted and transported, or otherwise moved, for example, tire molds or other annular shaped articles; but it will be obvious that other forms of elevating devices may be used. Where the lifting device is of the construction shown in Figures 1 and 2, it will be projected within the bodies to engage the same for lifting and transporting purposes.

Figures 1, 15:
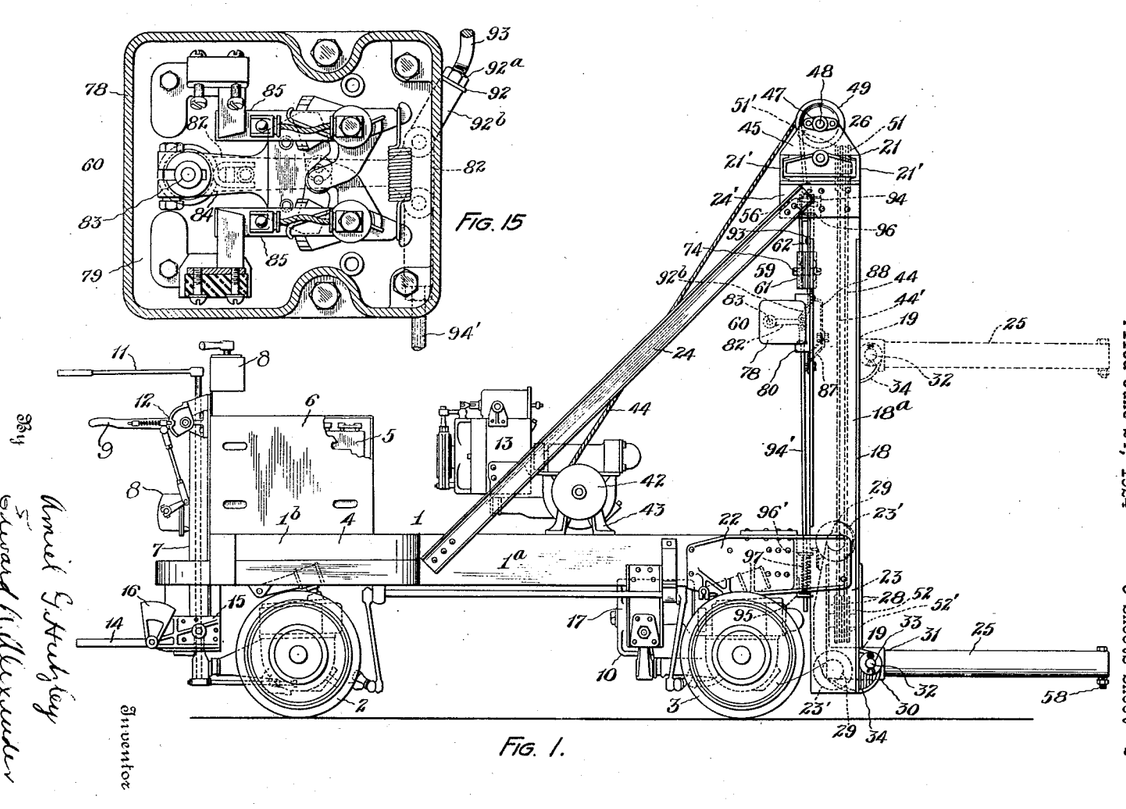
Fig. 1 is a side elevation of an industrial truck having a load handling mechanism embodying my invention.
Fig. 15 is a sectional view showing the switch mechanism in elevation.
Figures 2, 3, 4, 5, 6, 7, 8:
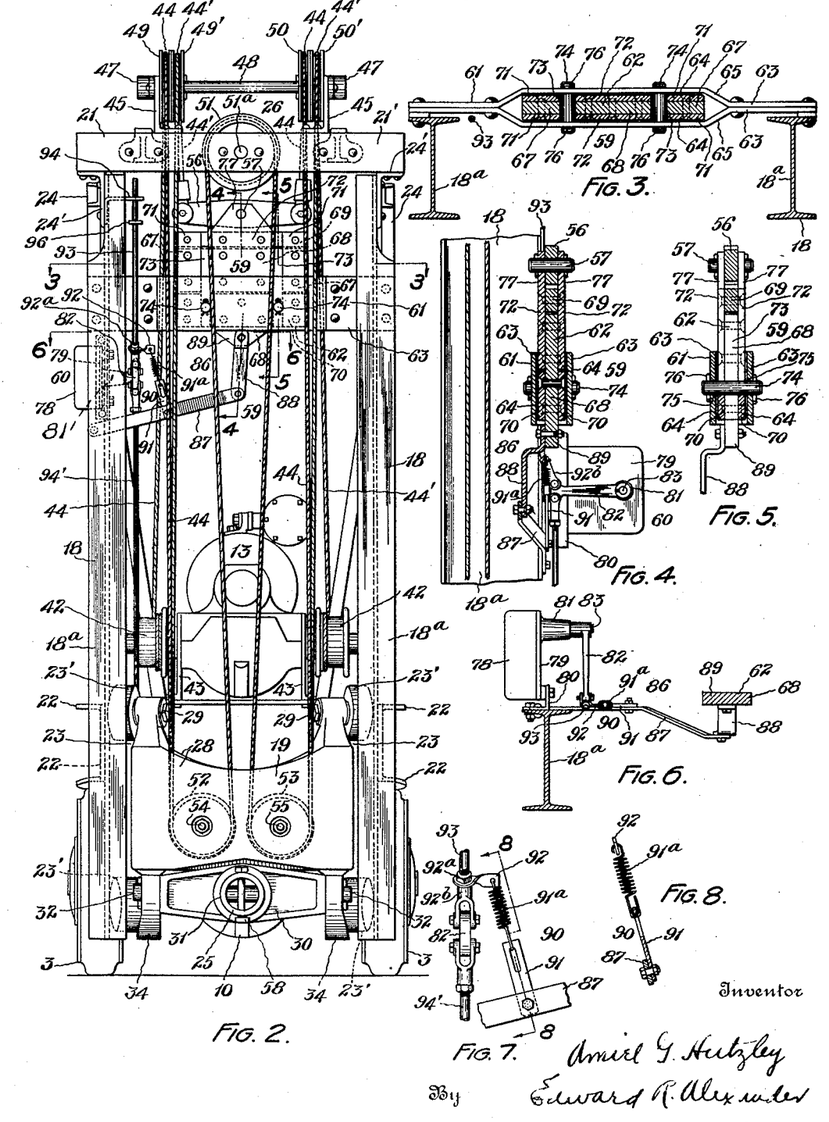
Fig. 2 is an end elevation of the truck looking towards the left in Fig. 1.
Fig. 3 is a section on the line 3—3 of Fig. 2.
Figs. 4 and 5 are sections on the lines 4—4 and 5—5, respectively, of Fig. 2.
Fig. 6 is a section on the line 6—6 of Fig. 2.
Fig. 7 is a fragmentary elevational view.
Fig. 8 is a section on the line 8—8 of Fig. 7.

Referring to Figures 1 and 2, the lifting device 25 is fitted at its inner end into an opening 31 formed in the supporting element 30. The supporting element 30 is provided at its opposite sides with trunnions 32, which rotatably fit suitable openings 33 formed in a pair of forwardly projecting arms 34, each integrally connected to one of the shoes 23. By preference, the trunnions constitute a single rod extending through openings formed in the supporting element 30 and the arms of the elevating member 19. The trunnions 32 serve to removably support the lifting device on the elevating member 19 and also permit the outer end of the lifting member to swing upwardly, so that during its lowering movement, if anything happens to be below it or the load being lowered, the lifting device may swing upwardly about the trunnions and thus eliminate danger of breakage of any part of the elevating member, lifting device or other parts of the truck. As clearly shown in Figure 1, the supporting element 30 extends inwardly beyond the axis of the tunnions 32, so that its inner end may engage the lower edge of the inner connecting plate 28 to maintain the lifting device in substantially horizontal position or against movement downwardly.

The hoisting and elevating mechanism 26 is connected to the elevating member 19 and serves to raise the latter to any desired elevation within the limits of the guide beams 18$^a$ (one position of the elevating member 19 being shown in dotted lines in Fig. 1) and to lower the same.

In the constructions herein shown I have illustrated, in each form, a raising and lowering mechanism in which two flexible members are used, but the invention may be applied to or co-operatively associated with such a mechanism wherein but one flexible member or more than two flexible members are employed.

The operating means for the hoisting and elevating mechanism preferably include an electric motor 13, already referred to, and winding drums 42 driven thereby. The motor and drums are mounted on standards 43 which are fixed upon the main frame 1, preferably between the battery casing 6 and the guide frame 18. The drums 42 have connected to them flexible members 44, 44', such as cables—which are operatively connected to the elevating member 19, as will be later described. The elements constituting the operating means herein shown and just referred to are similar in construction to and co-operative like corresponding elements in a co-pending application of Edward H. Remde, Serial No. 592,138, filed October 3, 1922, Patent No. 1,567,676, to which reference may be made, except that, as will be noted in Fig. 1, the standards 43 for the motor supporting cradle are arranged to support the latter and the motor 13 in substantially a horizontal position.

45 indicates hangers mounted on and secured to the channel bars 21', constituting the sill 21. The hangers are provided with suitable bearings 47 which support the opposite ends of a shaft 48. 49, 49', and 50, 50', indicate pairs of sheaves loosely mounted on the shaft 48 and arranged equal distances from a point midway between the guide members 18$^a$. 51, 51', indicate a pair of sheaves loosely mounted on a shaft 51$^a$ supported at its opposite ends in the channel bars 21' and arranged at right angles to the shaft 48 with its axis in a plane midway between the drums 42. 52, 52', and 53, 53', indicate pairs of sheaves loosely mounted on shafts 54, 55, respectively, disposed at opposite sides of and an equal distance from the plane in which the shaft 51$^a$ is supported and supported at their opposite ends in the plates 28. The ropes, cables or flexible members 44, 44', run over and around the sheaves and are adapted to be wound on and from the drums 42, to raise and lower the elevating member 19, together with whatever load is to be carried or transported or moved vertically by the lifting device carried thereby. The rope 44 extends from one drum 42 over the sheave 49, then around the sheave 52 and then over the sheave 51; from the sheave 51, the rope 44 runs around the sheave 53 and then around the sheave 50, its free end being connected to one end of an equalizing element 56, which is pivoted on a pivot 57, that is mounted in the manner hereinafter to be set forth. The other rope 44' extends from the adjacent drum 42 over the sheave 50', then around the sheave 53', and then over the sheave 51'; from the sheave 51' the rope 44' runs around the sheave 52' and then over around the sheave 49', its free end being connected to the opposite end of the equalizing element 56. The operation of winding the ropes 44, 44', on the drums 42 and unwinding them therefrom to raise and lower the elevating member will be readily understood. From the foregoing description, it will be seen that the ropes 44, 44', are wound on and off drums which are disposed at opposite sides of the central longitudinal plane of the truck frame, or a point which is midway between the guide members; also that the rope wound on and off one drum is carried over sheaves which are arranged equal distances from this point and connected to the end of the equalizing element, which is arranged on that remote side of the central longitudinal plane of the truck from the drum. By this arrangement the pull on the ropes incident to raising and lowering the elevating member and its load is equalized so that the force acts simultaneously through the sheaves 52, 52', and 53, 53', and the shafts therefor, to operate the elevating member vertically and in a direction parallel to the guide members 18$^a$ thereby eliminating any tendency to pull on or raise or lower one side of the shoe member faster than the other side. As a result, the elevating member 19 is guided freely between the guides 18$^a$ in its vertical movements without undue friction or binding therein or strains on the elevating mechanism. Furthermore, in winding on and from the drums and running around the guide sheaves, the tension in both ropes is the same, so that they (1) operate uniformly in running over and around the sheaves and (2) wear substantially equally.

58 indicates a device adjustably and removably supported on or near the free end of the lifting device 25 and serving to prevent the articles mounted thereon from sliding off its free end. The device 58 may be of any desired construction, such as a headed rod held in adjusted position by a nut.

Figure 9:
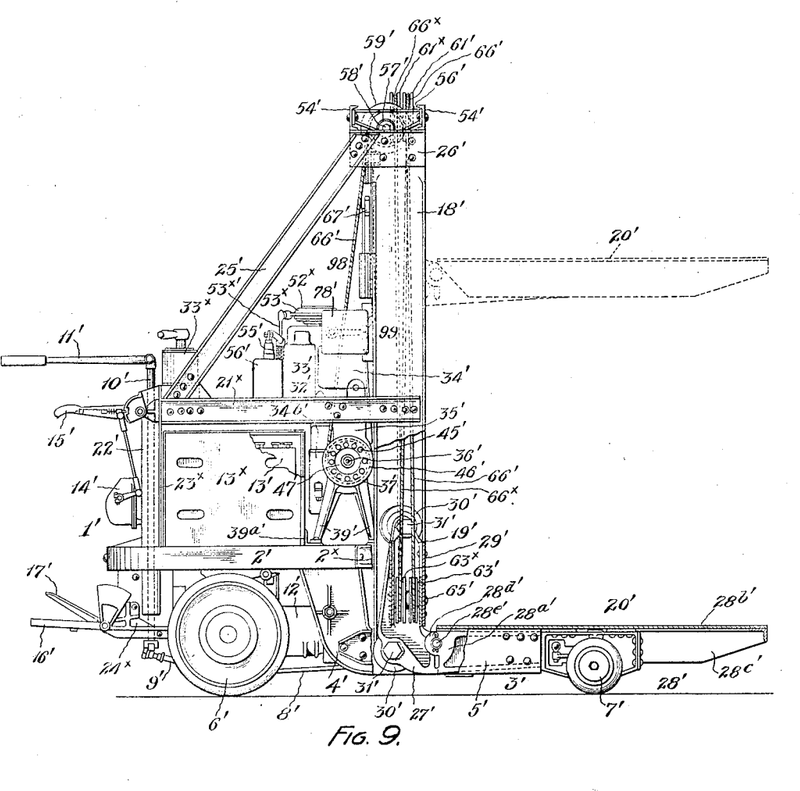
Fig. 9 is a side elevation of an industrial truck embodying my invention, the structural arrangement thereof being modified as compared to the type of truck shown in Fig. 1.
Figure 10:
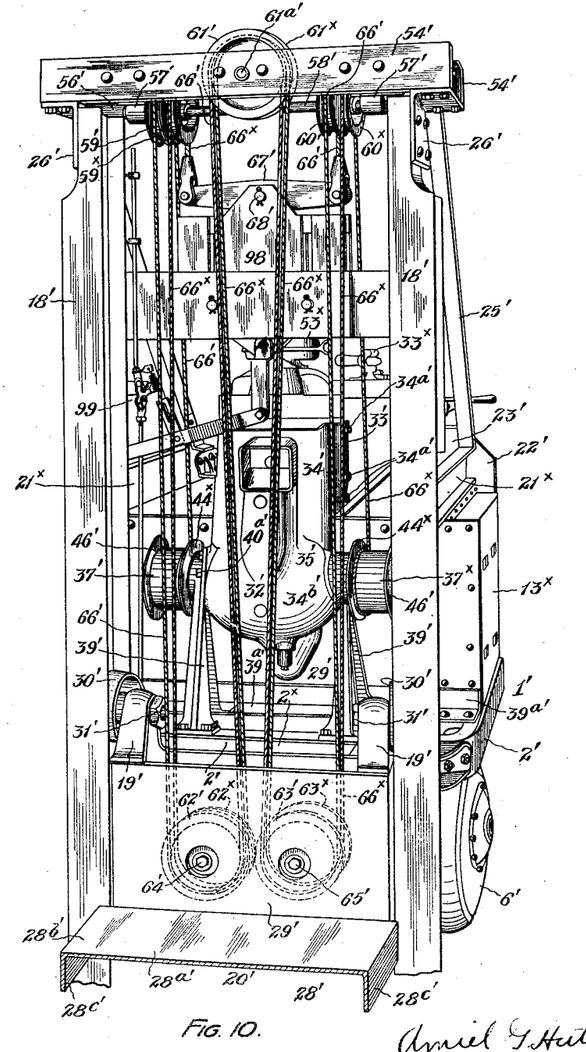
Fig. 10 is a fragmentary perspective view looking towards the left in Fig. 9.
Figures 11, 14:
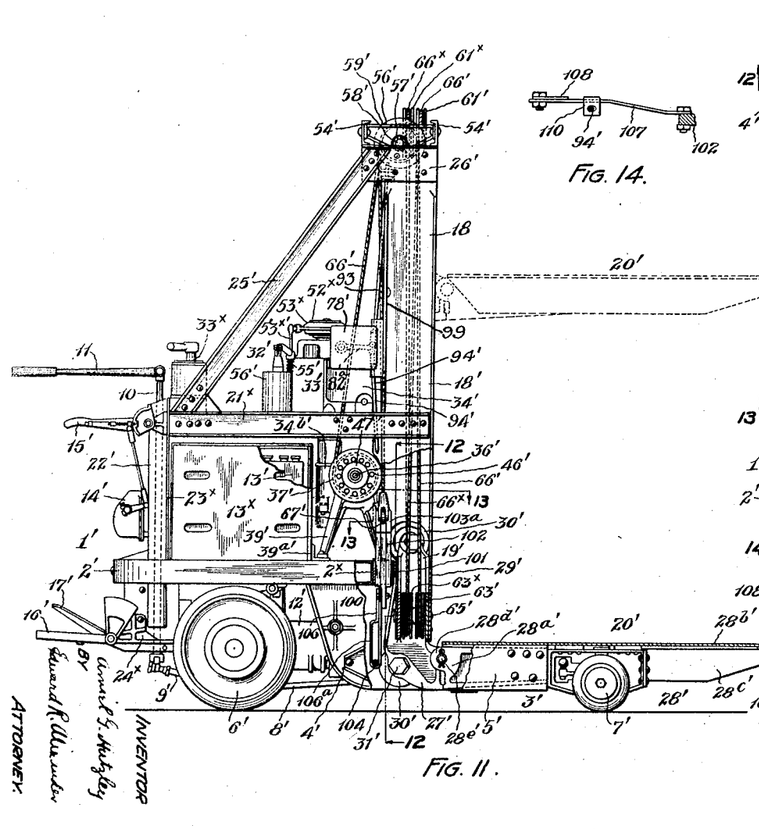
Fig. 11 is a view of an industrial truck, such as shown in Fig. 9, but embodying a further modification of the invention; the view being partly in section to facilitate the illustration.
Fig. 14 is a fragmentary section on the line 14—14 of Fig. 12.
Figure 12:
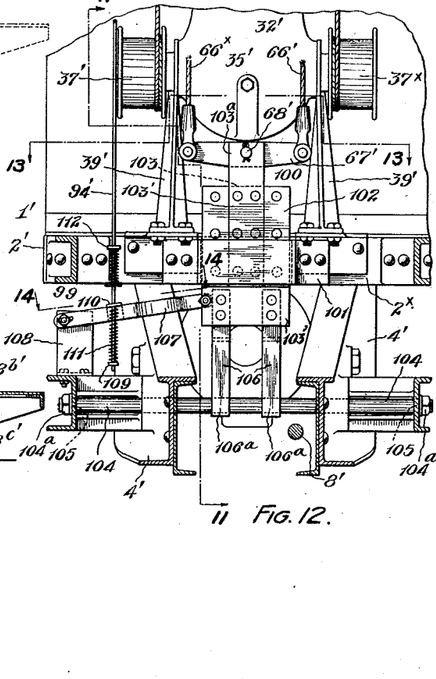
Fig. 12 is a section on the line 12—12 of Fig. 11.
Figure 13:
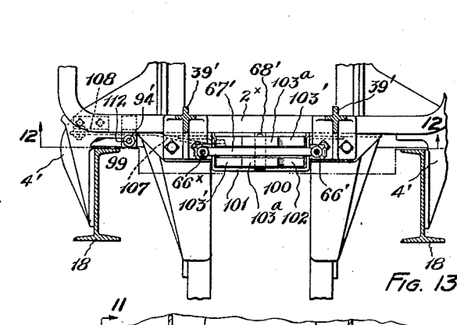
Fig. 13 is a section on the line 13—13 of Fig. 11.

59 indicates as an entirety a take-up mechanism for the cables 44, 44', serving to take up all slack which may occur therein due to stoppage of the movable member or device, for example, the elevating member 25 in Figs. 1 and 2 or the platform 20' in Figs. 9, 10 and 11, by its engagement with some obstruction disposed in its path of movement or otherwise. The take-up mechanism 59 is arranged to operate in the illustrated embodiment of my invention when the movable member is moving downwardly, and serves to take up slack in the cables, should the member be stopped at any point intermediate the ends of the guide 18. The take-up mechanism 59 and also the limiting means (indicated as an entirety at 60) may be arranged in any desired position such, for example, upon the guide frame 18. When so located, it may be arranged near the upper end of the guide frame as shown in Figs. 1, 2, 9 and 10, or such mechanism may, as shown in Figs. 11, 12 and 13, be arranged near the lower end of the guide frame, although it will be obvious that either or both thereof may be otherwise positioned on the guide frame or at some other convenient point on the truck.

Of the take-up mechanism 59, 61 indicates a transverse member extending across the guide frame 18 and connected thereto at its opposite ends in any desired manner.

In the preferred form of construction, the transverse member consists of the cross member 61, already referred to, and it may be constructed so as to serve as a guide for a weight 62, the purpose of which will later appear. The guide member 61 comprises a pair of plates 63 having their central portions laterally offset to form spaced parallel guide faces 64 between which the weight 62 may move upwardly and outwardly, as will later be set forth. As shown particularly in Fig. 3, each of the plates 63 is preferably bent at an angle, as indicated at 65, to position the guide faces 64 in parallel relation, and spaced so that the weight 62 may freely move between them, vertically. The weight 62 may be constructed in any desired manner, but preferably comprises intermediate sectional plates 66, 67, 68 and 69, and sectional facing plates 70, 71, 72, respectively riveted to the intermediate plates, or otherwise rigidly secured thereto. By making the weight of sectional plates rigidly secured together face to face, I secure the advantages of economical construction and at the same time provide in the weight one or more guide slots 73, and end walls therefor. The guide slots 73 receive guide elements 74 preferably comprising a pair of pins supported at their opposite ends in aligned openings 75 formed in the guide faces 64, such pins being held against endwise movement by suitable cotter pins 76 or other equivalent devices. As shown in Figs. 2, 3, 4 and 5, the sectional plates 67 and 68 are spaced from each other to form the slots 73 and the facing plates 71 and 72 are correspondingly spaced, and the intermediate plate 69 extends transversely across the slots 73 at its opposite ends and thus forms an end wall therefor and thereby serves as a stop to engage the guide elements 74 to limit the downward movement of the weight 62. The plates 72 are provided with centrally extended portions 77 and receive between them the pivot 57 for the equalizing bar to which the free ends of the cables 44, 44', are pivotally connected.

Due to the weight of the elevating member 25, the tension or pull on the cables 44, 44', acting through the equalizing bar 56 will serve to move the weight 62 upwardly and hold it against the guide pins 74, and the weight will be maintained in this position while the elevating member 25 is being raised and lowered by the winding or unwinding of the cables 44, 44', on or off of the drums 42, due to the operation of the motor 13 in one direction or the other; but in the event some obstruction becomes interposed below the elevating member 25, while it is moving downwardly, either by accident or otherwise, or for some other reason, and the elevated member is arrested or retarded while it is being moved downwardly, any slack occurring in either or both of the cables 44, 44', will be taken up by the gravitation of the weight 62 downwardly in its guides. By immediately taking up all slack occurring in the cables, or either thereof, the latter will remain taut throughout their length and all danger of their jumping or disengaging any or all of the sheaves or becoming dislocated on the drums 42 will be avoided.

The limiting means 60 is co-operatively associated with the take-up mechanism 59 so that upon the downward movement of the weight 62 to take up slack, which may occur under such circumstances as referred to above, or otherwise, in the cable 44, 44', the current to the operating motor 13 will be shut off relatively quickly and thus prevent further paying out of the cables from the drums 42 and resulting damage or disarrangement should the motor continue to operate, as otherwise the guides for the weight 62 would have to be extended to permit the latter to move a relatively long distance. Of these means 60, 78 indicates a casing having a base member 79 supported upon an angle plate 80, which is secured to the rear side wall of one of the guides 18. The base plate 79 is provided with a hollow boss 81 to receive a bearing for a rock shaft 83 which carries at its outer end an arm 82. The inner end of the rock shaft 83 carries a lever 84 which operates the movable contact 85 of a pair of contact devices mounted within the casing 78, to break the circuit to the motor 13 when operating in one direction to limit its operation.

The limit switch mechanism preferably comprises pairs of contact devices within the casing 78 through which current is supplied to the motor 13, such pairs of contact devices being arranged in spaced relation or at opposite sides of the lever 84 so that the movable contact of either pair may be operated when the lever is moved in one direction or the other; this construction and arrangement permitting me to stop the motor when the elevating member 25 reaches its predetermined limit of movement in either direction, thereby providing in a single switch mechanism, limiting means for automatically shutting off current to the motor (a) when the elevating member reaches the end of its movement upwardly or downwardly and (b) at any intermediate point in the downward movement of the elevating member in the event the take-up mechanism functions under circumstances referred to above.

The switch mechanism within the casing 78 may be constructed and operate substantially similar to corresponding elements disclosed and claimed in a co-pending application filed by E. H. Remde, Serial No. 610,791, accordingly it is not deemed necessary to illustrate in detail the construction of such switch mechanism. 93, 94', indicate rods extending upwardly and downwardly relative to the casing 78 and pivotally connected at their inner ends to the free end of the arm 82 and guided at their free ends in openings formed in brackets 94, 95. 96, 96', indicate collars adjustably secured to the rods 93, 94', respectively, and arranged at their free ends so as to be engaged by the elevating member 25 when it moves to its extreme upper position or extreme lower position, so that the elevating member may actuate either rod and through it rock the shaft 83 and thus break the current through one of the pairs of contact devices 85 mounted within the casing 78 to shut off current to the motor 13. 97 indicates a coil spring interposed between the collar 96' mounted on the lower end of the rod 94' and the bracket 95, and serving to support the rods in normal position with the lever 84 in its midposition, as shown in Fig. 4. When the elevating member 25 moves downwardly and engages with the collar 96', it moves the rods 94' and 93 downwardly, thereby compressing the spring 97. When the elevating member moves upwardly, the tension of the spring 97 acting upon the collar 96' moves the rods upwardly to their normal position. When the elevating member moves upwardly it engages with the collar 96, and moves the rods 93, 94', upwardly. Upon movement of the elevating member downwardly, the rods 93, 94' will gravitate downwardly in the guide brackets 94, 95, until the collar 96' is arrested by the spring 97, the latter thereby operating as a stop to limit such downward movement and thus support the rods in normal position.

86 indicates as an entirety a linkage connection between the weight 62 and the arm 82. This connection preferably comprises a bar 87 pivotally connected at one end to the adjacent guide 18 and a link 88 pivotally connected at its upper end to the extended member 89 of the intermediate plate 68, and pivotally connected at its lower end to the opposite end of the bar 87, so that the movement of the weight will operate to swing the latter downwardly when slack occurs in the cables 44, 44'. 90 indicates a connection between the bar 87 and the arm 82, preferably comprising a link 91 and a coil spring 91$^a$ connected at one end to the link 91 and at its opposite end to an arm 92, which in turn is connected to the rod 93, so that when the bar 87 swings downwardly it will move the rod 93 downwardly and through the latter operate the arm 82 to open the motor circuit.

The arm 92 is secured to the rod 93 in any desired manner, being preferably formed with an opening to receive the rod and clamped between a nut 92$^a$ and the end wall of the swivel 92$^b$ to which the arm 82 is pivotally connected. The coil spring 91$^a$ permits movement of the bar 87 relative to the rod 93 or arm 82 after the latter has moved to effect the opening of the switch element in the manner already described, so that the weight 62 may continue to operate downwardly until the winding drums 42 come to a complete rest due to the opening of the circuit through one of the pairs of contacts. This arrangement insures operation of the switch mechanism relatively quickly, as the weight 62 starts to move downwardly, and permits the latter to continue moving downwardly to take up all slack that occurs in the cables while the motor is stopping due to its momentum following the cutting off of the current. When the weight is in its uppermost position, the connection 90 is so arranged that there is no tension on the spring 91$^a$, thereby permitting the arm 82 to assume its neutral or mid-position under the influence of its operating spring (not shown) within the casing 78, but the spring 91$^a$ is of such construction that it will transmit the movement of the bar 87 in opposition to such spring to open one of the pairs of switch contacts as the weight starts to move downwardly.

Referring to Figs. 9 and 10, 1' indicates as an entirety a frame comprising a main section 2' and a sub-section 3', preferably arranged in a plane below the main section. The main section is constructed in any desired manner, but preferably includes side members, a front member and an end member 2$^x$, each formed from one or more channel bars. The inner or adjacent end of the main section 2' and sub-section 3' are preferably connected by a pair of angle members 4', each riveted to the frame members or sections in a well known manner.

The sub-section 3' preferably comprises pairs of parallel members 5'. 6' indicates a pair of wheels disposed below and preferably within the sides of the main section 2'.

The wheels 6' are preferably pivoted to an axle, (not shown) by means of knuckle joints in a well known manner, whereby they may be turned for steering purposes. 7' indicates a pair of wheels mounted on an axle (not shown) upon which the sub-section 3' is supported. The wheels 7' are preferably arranged to be swung about a vertical axis or axes for steering purposes, being connected by a link 8' and rod 9' to the steering column 10' for the wheels 6', whereby all four wheels may be simultaneously operated by a turning lever 11'. 12' indicates a motor for driving the wheels 6'. The motor 12' is operatively connected with the wheels 6' by suitable power transmitting mechanism (not shown). 13' indicates a suitable battery or batteries removably supported on the frame section 2' and arranged to supply current to the motor 12'. The batteries 13' may be inclosed in a suitable casing 13$^x$. 14' indicates a controller interposed in and controlling the circuit for the motor 12' in a well known manner, the controller being actuated by a suitable lever 15'. 16' indicates a step or base on which the operative stands when operating the truck, the steering lever 11' and the controller handle being arranged within convenient reach for this purpose. 17' indicates a foot pedal for controlling the brake or brakes (not shown) for the truck.

18' indicates a pair of spaced guide members disposed vertically, preferably intermediate the ends of the truck frame 1'. In the illustrative embodiment of truck construction the guide members 18' are disposed at the connection of the inner ends of the sections 2', 3', with each other, this arrangement (1) permitting the guide members to be extended to or below the sub-section 3' so that the platform may be lowered to the desired plane and (2) facilitating the rigid bracing of the guide members in a vertical position. The guide members 18' preferably comprise a pair of I beams, the channels of which oppose each other so that the side walls of the channels may serve as guides for shoes 19' which are supported between the channel guide walls and form a part of an elevating device or moving platform 20', to which reference will later be made. 21$^x$ indicates a pair of beams connected at their outer ends to struts 22', disposed at the front end of the main section 2' and supporting a dash 23$^x$ and brackets 24$^x$, to which the step or base 16' is connected. At their inner ends, the beams 21$^x$ are connected to the base portions of the channel bars 18' preferably by rivets. 25' indicates a pair of tie rods, each extending from the joint between the adjacent beam 21$^x$ and strut 22' to the upper end of the adjacent channel bar 18', being preferably secured to the latter by means of an end plate 26' extending laterally therefrom as shown in Fig. 9.

The elevating device or platform 20' comprises a shoe member 27' and a platform member 28' connected thereto. The shoe member 27' preferably comprises a pair of shoes 19' already referred to, connected together by a pair of spaced plates 29' and upper and lower shoe elements 30' carried by each shoe 19' and engaging the inner side walls of the adjacent beam 18'. Each shoe element 30' consists of a roller loosely mounted on a stud shaft 31' supported in the wall of the adjacent shoe 19'. The shafts 31' are inclined so that the circumferential surfaces of the rollers may engage the inclined inner surfaces of the side walls of the adjacent beam 18'. As will be understood from Fig. 9, the stud shafts 31' carried by each shoe 19' are inclined at an angle relative to each other and are offset relatively to the central longitudinal plane of the adjacent beam 18', so that the lower roller will engage its rear side wall and the upper roller will engage its front side wall. The platform member 28' preferably comprises a pair of spaced arms 28$^{a'}$ extending laterally relative to the shoe member 27' over the sub-section 3' and a plate 28$^{b'}$ disposed on the arms 28$^{a'}$. The plate may be provided with side walls 28$^{c'}$ and its outer end may extend beyond the arms 28$^{a'}$. Each of the arms 28$^{a'}$ is provided with a hinge element 28$^{d'}$ co-related with a hinge element at the lower end of the adjacent shoe 19', being connected thereto by pivot pin 28$^{e'}$ which connects the hinge elements of both arms to the shoes, this construction permitting the platform to swing upwardly at its free end.

32' indicates as an entirety the hoisting or elevating mechanism for the elevating device or platform 20'. Of this mechanism, 33' indicates a motor, preferably of the electric type, arranged to be supplied with current from the batteries 13' and operated by means of a controller 33$^x$. 34' indicates a supporting member, secured to the motor in a well known manner, preferably by cap screws 34$^{a'}$. The lower portion of the supporting member 34' is shaped to form a housing 34$^{b'}$ for power transmitting means 35'. 36' indicates a shaft preferably of sectional character, which is driven by the power means 35', the shaft 36' extending laterally in opposite directions through the housing, and having connected to their outer end drums 37', 37$^x$, to which reference will later be made. The housing 34$^{b'}$ is formed in its opposite sides with aligned openings, through which the shaft sections 36' extend. 39' indicates a pair of spaced standards mounted on the frame section 2', preferably near its rear end between the guide members 18' and the battery housing 13$^x$, and serving as supporting means for the power transmitting means 35', the supporting member 34' and the motor 33'. As shown, the standards are arranged to support the motor 33' with its armature shaft in the central longitudinal plane of the truck frame 2' and the drums 37', 37ˣ, at equal distance from and at the opposite sides of that plane. Each standard 39' is preferably provided with front and rear feet, the former being bolted to the rear side wall of the frame 2' or an angle bar carried thereby and the latter being secured to an angle bar 39ᵃ', extending transversely of the frame 2'—the upstanding wall of which bar may serve as a stop for the battery housing 13ˣ. At their upper ends, the standards 39' are provided with flanged collars which are in axial alignment with the aligned openings in the housing and support sleeves forming shafts for the drums 37', 37ˣ, to rotate on. The housing 34ᵇ' is secured to the flanges of the collars in any desired manner, for example by bolts 40ᵃ'. Each drum 37', 37ˣ, is held on the adjacent sleeve by a nut, having screw threaded engagement with the outer end of the adjacent shaft section. Each drum is provided with a flange 44ˣ around its inner end. To provide a flange for the outer end of the drum, I secure thereto, preferably by cap screws 45', a round plate 46'. The plate 46' has a hub 47', which fits over and is keyed or splined to the outer or free end of the adjacent shaft section, such connection serving to transmit the rotary movement of the shaft to the drum. The power means 35' preferably comprise a propeller shaft, supported in bearings in the housing 34ᵇ' and connected by a suitable joint with the armature shaft. The shaft is provided with a worm, which meshes with a worm gear. The upper end of the armature shaft extends beyond the motor 33' and carries a wheel with which a brake band or shoes may engage to stop the motor and through it the platform 20' and hold the latter in any desired position in which it may be stopped. The brake bands 33ˣ are connected to an operating lever 53ˣ' which is operated to apply the brake by a spring 55' and to release the brake by a solenoid 56', preferably connected in series with the motor 33'.

54' indicates a pair of channel bars connecting the upper ends of the guide members 18', being supported upon and secured to the brackets 26' each fixed to one of the guide members. 56' indicates hangers disposed between and secured to the channel bars 54'. The hangers 56' are provided with suitable bearings 57' which support the opposite ends of a shaft 58'. 59', 59ˣ, and 60', 60ˣ, indicate pairs of sheaves loosely mounted on the shaft 58' and arranged equal distances from a point midway between the guide members 18'. 61', 61ˣ, indicate a pair of sheaves loosely mounted on a shaft 61ᵃ', supported at its opposite ends in the channel bars 54' and arranged at right angles to the shaft 58' with its axis in a plane midway between the drums, 37', 37ˣ. 62', 62ˣ and 63', 63ˣ indicate pairs of sheaves loosely mounted on shafts 64', 65', respectively, preferably disposed at opposite sides of and equal distance from the plane in which the shaft 61ᵃ' is supported and supported at their opposite ends in the plates 29'. 66', 66ˣ, indicate ropes or other flexible members which run over and around the sheaves and are adapted to be wound on and off the drums 37', 37ˣ, to raise and lower the platform 20', together with whatever load is to be carried or transported or moved vertically thereby. The rope 66' extends from the drum 37' over the sheave 59', then around the sheave 62' and then over the sheave 61'; from the sheave 61', the rope 66' runs around the sheave 63' and then around the sheave 60', its free end being connected to one end of an equalizing element 67', which is pivoted on a pivot 68', supported in the manner to be later set forth. The rope 66ˣ extends from the drum 37ˣ over the sheave 60ˣ, then around the sheave 63ˣ and then over the sheave 61ˣ; from the sheave 61ˣ the rope 66ˣ runs around the sheave 62ˣ and then over and around the sheave 59ˣ, its free end being connected to the opposite end of the equalizing element 67'. The operation of winding the ropes on the drums, 37', 37ˣ, and unwinding them therefrom to raise and lower the platform will be readily understood. From the foregoing description, it will be seen that the ropes 66', 66ˣ, are wound on and off drums which are disposed at opposite sides of the central longitudinal plane of the truck frame, or a point which is midway between the guide members; also that the rope wound on and off one drum is carried over sheaves which are arranged equal distances from this point and connected to the end of the equalizing element which is arranged on that remote side of the central longitudinal plane of the truck from the drum.

98 indicates as an entirety the take-up mechanism and 99 indicates as an entirety the limiting means co-operatively connected to and associated with the take-up mechanism. As the elements of the take-up mechanism 98 and limiting means 99 are similar in construction and operation to corresponding elements of the take-up mechanism 59 and limiting means 60, respectively, already described, further description of this mechanism and means will not be required in connection with the type of truck shown in Figs. 9 and 10, particularly as the arrangement is similar to that shown in Figs. 1 and 2 except that the structural features of the truck frame and elevating member are modified to adapt the truck for any particular kinds of loading and unloading operations.

Figs. 11, 12 and 13 show a type of truck similar to that shown in Figs. 9 and 10, but in these views, the take-up mechanism indicated as an entirety at 100, is arranged near the lower end of the guide frame 18. Of this take-up mechanism 100, 101 indicates a transverse member secured at its opposite ends to the rear face of the end bar 2ˣ. The intermediate portion of the member 101 is shaped to form a side wall and end walls which cooperate with the end frame member 2ˣ to provide a guide for the weight 102. The weight 102 preferably comprises a plurality of plates 103, 103′, secured together face to face by rivets or other equivalent devices. The outer plates 103′ are extended upwardly, as shown at 103ᵃ and are formed with aligned openings to receive and support the pivot pin 68′ for the equalizing bar 67′. 104 indicates a rod mounted at its opposite ends in openings 105 formed in the connecting angle members 4′, the rod being provided at its opposite ends with screw threads to take nuts 104ᵃ which are tightened against the faces of the members 4′ to secure the rod thereto and to prevent endwise movement of the rod. 106 indicates a member connected at its upper end to the intermediate plate 103ᵃ and depending downwardly therefrom substantially in the plane of the rod 104 so as to engage the rod 104.

By preference I provide two connecting members between the weight 102 and rod 104, each being constructed as follows: each member comprises a bar which is bent back on itself, and connected to its main portion so as to form at its lower end a loop 106ᵃ through which the rod 104 extends, and through the engagement of the loop with the rod, the latter limits upward movement of the weight due to the pull of the cables 66′, 66ˣ, thereon incident to the weight of the platform 20′ and any load which may be supported thereon. As shown in Fig. 11, the loop 106ᵃ is elongated to permit free movement of the connecting member downwardly, without engaging the rod 104 when the weight 102 gravitates to take up slack in the cables 66′, 66ˣ, under circumstances already described in connection with the construction shown in Figs. 1 to 8, inclusive. In this form of construction, the wall of the loop 106ᵃ may serve to limit the downward movement of the weight. By providing two connecting members 106 (see Fig. 12) disposed in spaced relation, danger of forcing the weight laterally and wedging it between the walls of the guide member 101 is prevented. 107 indicates a bar pivotally connected at its opposite ends with the weight 102 and an upstanding bracket 108 carried by one of the adjacent angle members 4′. The pivotal connection between the bar 107 and 108 is of a slidable, pivotal character to permit movement of the bar 107 endwise as the weight 102 moves downwardly. In this form of construction, the connection between the bar 107 and the arm 82ᵃ of the switch means 99′ is provided in the following manner: the rod 94′ is extended downwardly and carries at its lower end a collar 109. 110 indicates a lug extending laterally from the bar 107 and formed with an enlarged opening through which the rod 94′ extends. 111 indicates a coil spring surrounding the rod 94′ and interposed between the lug 110 and collar 109. From this arrangement of the elements just described, it will be seen that when the bar 107 is moved downwardly by the weight 102, it will act through the spring 111 and collar 109 to move the rods 94′, 93, downwardly and the latter, in turn, will operate the arm 82ᵃ to open or separate one of the pairs of contacts within the casing 78 in the manner already described, and thus shut off current to the motor 33′, and stop the rotation of the drums 37′, 37ˣ. The spring 111 permits movement of the bar 107 after the rod 94′ has been operated to open the circuit so that the weight 102 is free to gravitate downwardly until all the slack in the cables is taken up.

The limit switch mechanism is provided with two pairs of contacts through which current flows to operate the motor in either direction and the rod 94′ is provided with a collar 112 that is engaged by the elevating member 20′ to stop it at the end of its downward movement. I also provide an upwardly extending rod, provided with a collar, which in turn is engaged by the elevating member 20′ when it reaches its extreme upper position. It will therefore be seen that in the forms of construction herein described and illustrated the automatic take-up mechanism is connected to or incorporated with the means that limit the movement of the elevating member upwardly and downwardly at predetermined positions, so that the take-up mechanism serves to stop the motor as well as to take up all slack in the hoisting members. By this construction I (1) stop the motor when slack occurs in the hoisting members irrespective of the position of the elevating member and (2) avoid the necessity of providing two separate switch mechanisms for stopping the motor.

By reason of such arrangement, the construction and wiring from the batteries to the motor are simplified.

To those skilled in the art to which my invention relates, many changes in construction and widely differing embodiments of my invention will suggest themselves without departing from the spirit and scope thereof. My disclosures and the description herein are purely illustrative and are not intended to be in any sense limiting.

What I claim is:

1. In apparatus of the class described, the combination of a support, a load handling member movably supported thereon, a drum rotatably mounted on said support, means for rotating said drum in either direction, a flexible member adapted to wind on and off said drum at one end and operatively engaging said load handling member to move it in one or more directions, means connecting the opposite end of said flexible member to said support and arranged to take up slack occurring therein at any time, and means interposed between said connecting means and the supply of power to said drum rotating means for cutting off said supply upon operation of said connecting means.

2. In apparatus of the class described, the combination of a support, a load handling member movably supported thereon, a drum rotatably mounted on said support, means for rotating said drum in either direction, a flexible member adapted to wind on and off said drum at one end and operatively engaging said load handling member to move it in one or more directions and having a movable connection with said support, and means actuated by the movement of the movable connection for said flexible member to cut off supply of power to said drum operating means when slack occurs in said flexible member as the load handling member moves in one direction.

3. In apparatus of the class described, the combination of a support, a load handling member movably supported thereon, a drum rotatably mounted on said support, an electric motor connected to said drum for rotating it in either direction, a flexible member adapted to wind on and off said drum at one end and operatively engaging said load handling member to move it in either direction, means connecting the opposite end of said flexible member to said support and operable to take up slack occurring therein at any time, and means interposed between said connecting means and the source of current supply to said motor for cutting off such current upon operation of said connecting means.

4. In apparatus of the class described, the combination of a support, a load handling member movably supported thereon, a drum rotatably mounted on said support, an electric motor connected to said drum for rotating it in either direction, a flexible member adapted to wind on and off said drum at one end and operatively engaging said load handling member to move it in either direction and having a movable connection with said support, and means actuated by the movable connection for said flexible member to break the circuit to said motor when slack occurs in said flexible member at any point intermediate the ends of travel of said load handling member in one direction.

5. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, means connecting the opposite end of said flexible member to said support and arranged to take up slack occurring therein, means interposed between said connecting means and the supply of power to said drum rotating means for cutting off said supply upon operation of said connecting means.

6. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, means connecting the opposite end of said flexible member to said support and arranged to take up slack occurring therein, and means automatically operating to shut off supply of power to said drum operating means when slack occurs in said flexible member as the load handling member moves in one direction.

7. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, means connecting the opposite end of said flexible member to said support and arranged to take up slack occurring therein, and means automatically operating to break the circuit to said motor when slack occurs in said flexible member at any point intermediate the ends of travel of said load handling member in one direction.

8. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, means connecting the opposite end of said flexible member to said support and arranged to take up slack occurring therein, and means automatically operating to break the circuit to said motor when slack occurs in said flexible member at any point intermediate the ends of travel of said load handling member in one direction, said operating means being actuated by said connecting means.

9. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, and means connecting the opposite end of said flexible member to said support and arranged to take up slack occurring therein, said connecting means comprising a weight and an abutment limiting the movement of the weight upwardly but permitting it to gravitate downwardly to take up slack in said flexible member at any time.

10. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, and means connecting the opposite end of said flexible member to said support and arranged to take up slack occurring therein, said connecting means comprising a guide carried by said frame, a weight and an abutment limiting the movement of the weight upwardly but permitting it to gravitate downwardly to take up slack in said flexible member at any time.

11. In apparatus of the class described, the combination of a frame, supporting wheels therefor, means for driving certain of said wheels, a load handling member movably supported on said frame, a drum rotatably mounted on said frame, means for rotating said drum in either direction, a flexible member adapted to wind on and off said drum at one end and operatively engaging said load handling member to move it in opposite directions, means connecting the opposite end of said flexible members to said support and arranged to take up slack occurring therein, said connecting means comprising a weight and an abutment limiting the movement of the weight upwardly but permitting it to gravitate downwardly to take up slack in said flexible member at any time, and means interposed between said connecting means and the source of power supply for said drum rotating means for cutting off said supply upon movement of said weight downwardly.

12. In apparatus of the class described, the combination of a frame carrying a vertically arranged guide frame, wheels for supporting said first mentioned frame, a load handling member movable upwardly and downwardly in said guide frame, a motor, a drum connected to said motor and rotated thereby, and a flexible member adapted to wind on and off said drum at one end, said flexible member operatively engaging said load handling member and connected at its opposite end to an element movably mounted on one of said frames, and held against movement upwardly thereon but free to move downwardly to take up slack occurring at any time in said flexible member.

13. In apparatus of the class described, the combination of a frame carrying a vertically arranged guide frame, wheels for supporting said first mentioned frame, a load handling member movable upwardly and downwardly in said guide frame, a motor, a source of power supply for said motor arranged to operate it in either direction, a drum connected to said motor and rotated thereby, a flexible member adapted to wind on and off said drum at one end, said flexible member operatively engaging said load handling member and connected at its opposite end to an element movably mounted on one of said frames, and held against movement upwardly thereon but free to move downwardly to take up slack occurring at any time in said flexible member, and means operated by the movement of said movable element to cut off the supply of power to said motor.

14. In apparatus of the class described, the combination of a frame carrying a vertically arranged guide frame, wheels for supporting said first mentioned frame, a load handling member movable upwardly and downwardly in said guide frame, a motor, a source of power supply for said motor arranged to operate it in either direction, a drum connected to said motor and rotated thereby, a flexible member adapted to wind on and off said drum at one end, said flexible member operatively engaging said load handling member and connected at its opposite end to an element movably mounted on one of said frames, and held against movement upwardly thereon but free to move downwardly to take up slack occurring at any time in said flexible member, and means operable to stop said motor at any point between the ends of movement of said member in one direction when slack occurs in said flexible member.

15. In apparatus of the class described, the combination of a frame carrying a vertical guide frame, wheels for supporting said frame, a load handling member movable upwardly and downwardly in said guide frame, an electric motor, a source of current supply for said motor arranged to operate it in opposite directions, a drum connected to said motor and rotated thereby, a flexible member adapted to wind off and on said drum at one end, said flexible member engaging said load handling member, means for connecting the opposite end of said flexible member to one of said frames, said connecting means including a movable element arranged to take up slack occurring in said flexible member at any time, and means operated by said movable element for breaking the circuit to said motor.

16. In apparatus of the class described, the combination of a frame carrying a vertical guide frame, wheels for supporting said frame, a load handling member movable upwardly and downwardly in said guide frame, an electric motor, a source of current supply arranged to operate said motor in opposite directions, a drum connected to said motor and rotated thereby, a flexible member adapted to wind off and on said drum at one end, said flexible member engaging said load handling member, means for connecting the opposite end of said flexible member to one of said frames, said connecting means including a weight arranged to gravitate to take up slack occurring in said flexible member at any time, means operated by said movable member for breaking the circuit to said motor, and a stop for limiting the movement of the weight upwardly.

17. In apparatus of the class described, the combination of a frame carrying a vertical guide frame, wheels for supporting said frame, a load handling member movable upwardly and downwardly in said guide frame, an electric motor, a source of current supply arranged to operate said motor in opposite directions, a drum connected to said motor and rotated thereby, a flexible member adapted to wind off and on said drum at one end, said flexible member engaging said load handling member, means for connecting the opposite end of said flexible member to one of said frames, said connecting means including a weight arranged to gravitate to take up slack occurring in said flexible member at any time, a stop for limiting the movement of the weight upwardly, and means operated by said movable member for breaking the circuit to said motor.

18. In apparatus of the class described, the combination of a frame, wheels for supporting said frame, a guide frame mounted on said first mentioned frame, a load handling member movable upwardly and downwardly in said guide frame, a motor, a pair of drums connected to and rotated by said motor, a source of power supply to said motor arranged to operate it in either direction, pairs of sheaves rotatably carried by one of said frames, and said member, respectively, a pair of flexible members arranged to wind on and off said drums at corresponding ends and operatively engaging said pairs of sheaves, an equalizing bar to which the opposite ends of said flexible members are connected, and means interposed between said equalizing member and the source of power supply for said motor automatically operating to cut off said supply in the event slack occurs in either of said flexible members.

19. In apparatus of the class described, the combination of a frame, wheels for supporting said frame, a guide frame mounted on said first mentioned frame, a load handling member movable upwardly and downwardly in said guide frame, a motor mounted on one of said frames, a pair of drums connected to and rotated by said motor, a source of power supply to said motor arranged to operate it in either direction, pairs of sheaves rotatably carried by one of said frames and said member, respectively, a pair of flexible members arranged to wind on and off said drums at corresponding ends and operatively engaging said pairs of sheaves, means for connecting the opposite ends of said flexible members to one of said frames, and devices interposed between said connecting means and the source of power supply for said motor automatically operating to cut off said supply in the event slack occurs in either of said flexible members.

20. In apparatus of the class described, the combination of a wheel mounted frame, a guide frame mounted thereon, a load handling member movable upwardly and downwardly in said guide frame, a motor mounted on one of said frames, a pair of drums connected to and rotated by said motor, a source of power supply to said motor arranged to operate it in either direction, pairs of sheaves rotatably carried by one of said frames and said member, respectively, a pair of flexible members arranged to wind on and off said drums at corresponding ends and operatively engaging said pairs of sheaves, an equalizing bar to which the opposite ends of said flexible members are connected, and a weight to which said equalizing bar is pivotally connected serving to take up slack occurring in said flexible members at any time.

21. In apparatus of the class described, the combination of a wheel mounted frame, a guide frame thereon, a load handling member movable upwardly and downwardly in said guide frame, a motor mounted on one of said frames, a pair of drums connected to and rotated by said motor, a source of power supply to said motor arranged to operate it in either direction, pairs of sheaves rotatably carried by one of said frames and said member, respectively, a pair of flexible members arranged to wind on and off said drums at corresponding ends and operatively engaging said pairs of sheaves, an equalizing bar to which the opposite ends of said flexible members are connected, a weight to which said equalizing bar is pivotally connected serving to take up slack occurring in said flexible members at any time, and means actuated by said weight for cutting off the source of power to said motor when the weight gravitates.

22. In apparatus of the class described, the combination of a frame, supporting wheels therefor, guides mounted on said frame, a load handling member movable upwardly and downwardly in said guides, an electric motor mounted on said frame, a pair of drums connected to and operated by said motor, a source of current supply to said motor arranged to operate it in either direction, pairs of sheaves carried by said member and said guides, a pair of flexible members arranged to wind on and off said drums at corresponding ends and operatively engaging said pairs of sheaves, an equalizing bar to which the opposite ends of said flexible members are connected, a guide carried by said first mentioned guides, a weight slidably mounted in said last mentioned guide and supporting said equalizing bar, and a stop device carried by said weight guide for limiting the upward movement of the weight.

23. In apparatus of the class described, the combination of a frame, supporting wheels therefor, guides mounted on said frame, a load handling member movable upwardly and downwardly in said guides, an electric motor mounted on said frame, a pair of drums connected to and operated by said motor, a source of current supply to said motor arranged to operate it in either direction, pairs of sheaves carried by said member and said guides, a pair of flexible members arranged to wind on and off said drums at corresponding ends and operatively engaging said pairs of sheaves, an equalizing bar to which the opposite ends of said flexible members are connected, a guide carried by said first mentioned guides, a weight slidably mounted in said last mentioned guide and supporting said equalizing bar, switch mechanism interposed in the circuit to said motor, and means actuated by said weight to operate said switch mechanism, when slack occurs in said flexible members, to break the circuit to said motor.

24. In apparatus of the class described, the combination of a main frame, supporting wheels therefor, a guide frame mounted on said main frame, an elevating member movable upwardly and downwardly in said guide frame, an electric motor mounted on one of said frames, a source of current supply for said motor, raising and lowering mechanism for said elevating member, said mechanism including a flexible member operatively engaging said elevating member and connected at one end to an element driven by said motor and actuated thereby, means normally acting on the other end of said flexible member to take up slack therein, and means for automatically stopping said motor, said means including elements operable when said elevating member reaches its limit of movement in one direction and separate elements actuated by said slack take-up means and operable at any point intermediate the ends of movement of said elevating member when slack occurs in said flexible member.

25. In apparatus of the class described, the combination of a frame, supporting wheels therefor, guides mounted on said frame, an elevating member movable upwardly and downwardly in said guides, an electric motor mounted on said frame, a source of current supply for said motor, raising and lowering mechanism for said elevating member, said mechanism including a flexible member operatively engaging said elevating member and connected at one end to an element actuated by said motor, and means for automatically stopping said motor, said means including a switch mechanism, a pair of rods carrying tappets one of which is arranged to be engaged by said elevating member when it reaches the end of its movement in either direction, and devices connected to one of said rods and actuated by the latter to operate said switch mechanism, a movable member to which the opposite end of said flexible member is connected, and devices interposed between said movable member and one of said rods and acting through the latter to operate said switch mechanism when said movable member operates.

26. In apparatus of the class described, the combination of a frame, supporting wheels therefor, a pair of guides mounted on said frame, an elevating member movable upwardly and downwardly in said guides, an electric motor mounted on said frame, a source of current supply for said motor, raising and lowering mechanism for said elevating member, said mechanism including a flexible member operatively engaging said elevating member and connected at one end to a device operated by said motor, a movable member to which the opposite end of said flexible member is connected, and means for automatically stopping said motor, said means including a switch mechanism, a pair of rods carrying tappets one of which is arranged to be engaged by said elevating member when it reaches the end of its movement in either direction, and devices interposed between said movable member and one of said rods and acting through the latter to operate said switch mechanism when said movable member operates.

27. In apparatus of the class described, the combination of a support, a load handling member, a drum on said support, means for rotating said drum in either direction, a flexible member connected at one end to said drum and operatively engaging said support and said member to raise and lower the latter, a device movably mounted on said support connected to the opposite end of said flexible member and normally exerting a pull thereon in one direction, means for limiting the movement of said device in the opposite direction, and a mechanism actuated by the movement of said device for stopping said drum rotating means.

28. In apparatus of the class described, the combination of a support, a guide thereon, a load handling member slidable on said guide, a flexible member operatively engaging said load handling member to operate it along said guide, a winding means for one portion of said flexible member, a device for connecting another portion of said flexible member to said support, said device being held against movement in one direction but free to move in another direction to take up slack in said flexible member, and means for stopping said winding means, said means being operable by said load handling member when it moves to a predetermined position in either direction, or by said connecting device when the latter moves to take up slack in said flexible member.

In testimony whereof, I have hereunto subscribed my name.

AMIEL G. HUTZLEY.